(12) United States Patent
Childers et al.

(10) Patent No.: US 8,896,948 B2
(45) Date of Patent: *Nov. 25, 2014

(54) CUSTOMIZING A RANGE OF ACCEPTABLE TAPE DIMENSIONAL STABILITY WRITE CONDITIONS

(71) Applicant: International Business Machines Corporation, Armonk, NY (US)

(72) Inventors: Edwin R. Childers, Tucson, AZ (US); Reed A. Hancock, Tucson, AZ (US); Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,053

(22) Filed: Mar. 3, 2014

(65) Prior Publication Data

US 2014/0177088 A1    Jun. 26, 2014

Related U.S. Application Data

(63) Continuation of application No. 13/411,152, filed on Mar. 2, 2012.

(51) Int. Cl.
*G11B 5/584* (2006.01)
*G11B 5/008* (2006.01)

(52) U.S. Cl.
CPC ............ *G11B 5/00817* (2013.01); *G11B 5/584* (2013.01); *G11B 5/00813* (2013.01)
USPC ......... 360/31; 360/77.12; 360/78.02; 360/83; 360/90

(58) Field of Classification Search
None
See application file for complete search history.

(56) References Cited

U.S. PATENT DOCUMENTS

| | | | |
|---|---|---|---|
| 6,141,174 A | 10/2000 | Judge et al. | |
| 6,222,698 B1 | 4/2001 | Barndt et al. | |
| 6,690,535 B2 | 2/2004 | Wang | |
| 6,992,857 B2 | 1/2006 | Knowles et al. | |
| 7,158,339 B2 | 1/2007 | Kuse et al. | |
| 7,193,812 B2 | 3/2007 | Eaton | |
| 7,301,724 B2 | 11/2007 | Brittenham | |
| 7,787,203 B2 | 8/2010 | Biskeborn et al. | |
| 7,839,599 B2 | 11/2010 | Bui et al. | |
| 2002/0085304 A1 | 7/2002 | Wang | |
| 2005/0018349 A1 | 1/2005 | Eaton | |
| 2006/0285240 A1 | 12/2006 | Jurneke | |
| 2011/0051283 A1 | 3/2011 | Harper et al. | |
| 2011/0170214 A1 | 7/2011 | Bui et al. | |

OTHER PUBLICATIONS

UK Search Report dated Jun. 10, 2013 for GB1302854.3 filed Feb. 19, 2013.

*Primary Examiner* — Muhammad N Edun

(57) ABSTRACT

Described are embodiments of an invention for customizing the range of acceptable write conditions to a tape of a tape cartridge that contracts or expands laterally based on environmental conditions. The tape drive utilizes servo information to determine if the tape has expanded or contracted from the nominal dimension and to determine the magnitude of the expansion or contraction. In the case of expansion, the magnitude of the determined expansion and the stored maximum amount of contraction must be below a predetermined threshold value to allow a write. In the case of contraction, the magnitude of the determined contraction and the stored magnitude of expansion must be below the same predetermined threshold value to allow a write. If the determined magnitude of contraction or expansion is greater than the stored magnitude of contraction or expansion, respectively, then the new extreme is stored.

13 Claims, 8 Drawing Sheets

| Threshold | 50 | | | | | | | | | |
|---|---|---|---|---|---|---|---|---|---|---|
| Sample | 1 | 2 | 3 | 4 | 5 | 6 | 7 | 8 | 9 | 10 |
| $CM_{min}$ | 0 | 0 | 10 | 15 | 15 | 30 | 30 | 30 | 30 | 35 |
| $CM_{max}$ | 0 | 10 | 0 | 0 | 5 | 5 | 5 | 15 | 15 | 15 |
| $y_{diff}$ | 0 | 10 | 15 | -5 | 30 | -5 | -15 | 25 | 35 | 40 |
| $y_{diff} > 0?$ | yes | yes | yes | no | yes | no | no | yes | yes | yes |
| POSITIVE $y_{diff}$: Contraction | | | | | | | | | | |
| $\|y_{diff}\| + CM_{max}$ | yes | yes | yes | | yes | | | yes | yes | yes |
| $\|y_{diff}\| + CM_{max} >$ Threshold? | 0 | 10 | 15 | | 35 | | | 40 | 50 | 55 |
| $\|y_{diff}\| > CM_{min}?$ | no | no | no | | no | | | no | no | yes |
| Set $CM_{min}$ | no | yes | yes | | yes | | | no | yes | |
| | | 10 | 15 | | 30 | | | | 35 | |
| NEGATIVE $y_{diff}$: Expansion | | | | | | | | | | |
| $\|y_{diff}\| + CM_{min}$ | | | | yes | | yes | yes | | | |
| $\|y_{diff}\| + CM_{min} >$ Threshold? | | | | 20 | | 35 | 45 | | | |
| $\|y_{diff}\| > CM_{max}?$ | | | | no | | no | no | | | |
| Set $CM_{max}$ | | | | yes | | no | yes | | | |
| | | | | 5 | | | 15 | | | |
| Allow Write? | yes | yes | yes | yes | yes | yes | yes | yes | yes | NO |
| $CM_{max} + CM_{min}$ | 0 | 0 | 10 | 15 | 20 | 35 | 35 | 45 | 45 | 50 |

FIG. 8

CUSTOMIZING A RANGE OF ACCEPTABLE TAPE DIMENSIONAL STABILITY WRITE CONDITIONS

RELATED APPLICATIONS

This application is a continuation of U.S. patent application Ser. No. 13/411,152 filed Mar. 2, 2012, which is incorporated by reference.

TECHNICAL FIELD

This invention generally relates to tape drives for moving an elongate tape between a supply reel and a take-up reel, for example for writing and reading data on the elongate tape.

BACKGROUND

As tape capacity increases with each generation, smaller and smaller track spacing is being demanded along with tighter Track MisRegistration (TMR) requirements and increased linear density such that tape capacity can be effectively increased without an accompanying loss in data integrity. One of the factors that impedes the increased linear density is the dimensional stability of the tape. Tape Dimensional Stability (TDS) is a measure of the positional stability of the magnetic data tracks relative to each other and is a function of the tape properties and environmental effects such as temperature, humidity, tension, and creep. These environmental factors can cause the tape to expand or contract laterally, across the width of the tape. Therefore, when a tape is written to in one environmental extreme and subsequently read from in another extreme, the position of the data tracks across the tape width can change enough to cause signal degradation or read errors.

SUMMARY OF THE INVENTION

Described are embodiments of an invention for customizing the range of acceptable write conditions to a tape of a tape cartridge that contracts or expands laterally based on environmental conditions. Specifically, in one embodiment, the tape drive utilizes servo information to determine if the tape has expanded or contracted laterally from the nominal dimension. Further, the tape drive utilizes the servo information to determine the magnitude of the expansion or contraction. The magnitude of expansion or contraction and previously stored extremes of expansion or contraction are used to determine if a write operation should be allowed to the tape of the tape cartridge. In the case of expansion, the magnitude of the determined expansion and the stored maximum acceptable amount of contraction must be below a predetermined threshold value to allow a write. In the case of contraction, the magnitude of the determined contraction and the stored magnitude of expansion must be below the same predetermined threshold value to allow a write. The predetermined threshold value defines the size of the range of tape drive acceptable write conditions to the tape of the tape cartridge. The sum of the maximum acceptable amount of expansion and the maximum acceptable amount of contraction must be at or below the predetermined threshold value. If the determined magnitude of contraction or expansion is greater than the stored magnitude of contraction or expansion, respectively, then the new extreme is stored. Thus, if the tape cartridge is in an environment in which the tape tends to contract, then the acceptable write conditions skews to a contracting environment. Further, since the range of acceptable write conditions is customized to the environment experienced by the tape of a tape cartridge, a smaller portion of the TMR budget may be dedicated to tape dimensional stability while still ensuring read back of data.

For example, an embodiment of a computer implemented method of establishing a range of maximum expansion and maximum contraction for acceptable write condition a tape of a tape cartridge includes determining if the tape has expanded or contracted in a lateral direction. If the tape has expanded in the lateral direction then the method includes determining the amount of expansion and determining if the sum of the amount of the expansion and a maximum amount of contraction is less than a predetermined threshold value. If the sum is less than the predetermined threshold value then the method stores the amount of expansion as the maximum acceptable amount of expansion. If the tape has contracted then the method includes determining the amount of contraction and determining if the sum of the amount of contraction and the maximum acceptable amount of expansion is less than the predetermined threshold value. If the sum is less than the predetermined threshold value then the method stores the amount of contraction as the maximum acceptable amount of contraction.

In one embodiment, the method also includes disallowing a write operation if the sum of the amount of expansion and the maximum acceptable amount of contraction is greater than the predetermined threshold value. Further, in one embodiment, the method includes disallowing a write operation if the sum of the amount of contraction and the maximum acceptable amount of expansion is greater than the predetermined threshold value.

In one embodiment the sum of the maximum acceptable amount of contraction and the maximum acceptable amount of expansion are less than, or equal to the predetermined threshold value. In one embodiment, the amount of expansion and the amount of contraction of the tape is determined with servo information. Still further, in one embodiment, the maximum acceptable amount of contraction and the maximum acceptable amount of expansion are stored in a cartridge memory of the tape cartridge.

In one embodiment, the method further includes repeating the steps of determining if the tape has expanded or contracted, determining the amount of expansion or amount of contraction, and storing the amount of expansion and contraction until the maximum acceptable amount of contraction and the maximum amount of expansion sum to the predetermined threshold. Further, the maximum acceptable amount of expansion and maximum acceptable amount of contraction may be initialized at zero at the time of manufacturer of the tape or when the tape is written to from the beginning of tape.

In another embodiment of a tape drive having a head with a plurality of read and write elements and a plurality of servo elements and a drive control system for moving tape across the head, the tape drive is configured to determine if the tape has expanded or contracted in the lateral direction. If the tape has expanded in the lateral direction then the tape drive is configured to determine the amount of expansion and determine if the sum of the amount of the expansion and a maximum amount of contraction is less than a predetermined threshold value. If the sum is less than the predetermined threshold value then the tape drive is configured to store the amount of expansion as the maximum acceptable amount of expansion. If the tape has contracted then the tape drive is configured to determine the amount of contraction and determine if the sum of the amount of contraction and the maximum acceptable amount of expansion is less than the predetermined threshold value. If the sum is less than the predetermined threshold value then the tape drive is configured to store the amount of contraction as the maximum acceptable amount of contraction.

In another embodiment of a computer program product for establishing a range of maximum expansion and maximum contraction for acceptable write conditions on tape of a tape cartridge, the computer program product including computer readable storage medium having computer readable program code embodied therewith, the computer readable program code including computer readable program code configured to determine if the tape has expanded or contracted in the lateral direction. If the tape has expanded in the lateral direction then the computer readable program code is configured to determine the amount of expansion and determine if the sum of the amount of the expansion and a maximum amount of contraction is less than a predetermined threshold value. If the sum is less than the predetermined threshold value then the computer readable program code is configured to store the amount of expansion as the maximum acceptable amount of expansion. If the tape has contracted then the computer readable program code is configured to determine the amount of contraction and determine if the sum of the amount of contraction and the maximum acceptable amount of expansion is less than the predetermined threshold value. If the sum is less than the predetermined threshold value then the computer readable program code is configured to store the amount of contraction as the maximum acceptable amount of contraction.

BRIEF DESCRIPTION OF THE DRAWINGS

Embodiments of the present invention are understood by referring to the figures in the attached drawings, as provided below.

FIG. 8 is a table illustrating an example of establishing a range of acceptable write conditions in accordance with an embodiment of the invention.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENT

Figure 1:
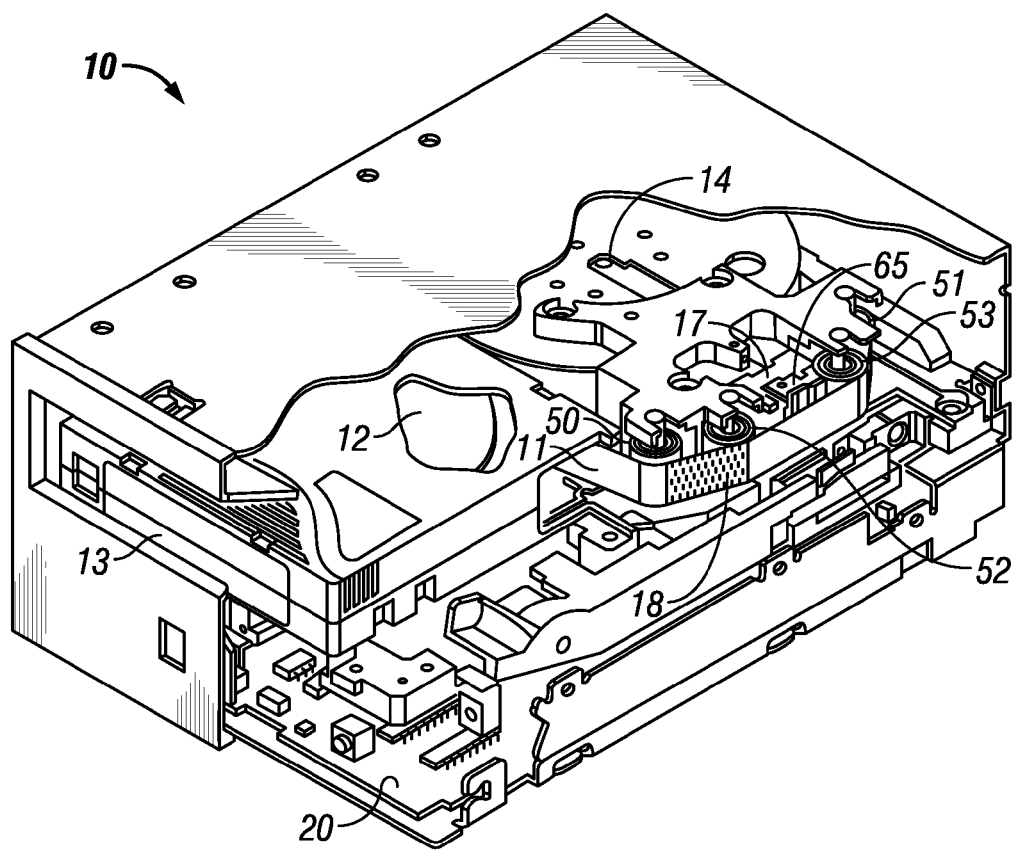
FIG. 1 is a partially cut away view of an exemplary tape drive with a tape cartridge and elongate tape in accordance with an embodiment of the invention.

Described are embodiments of an invention for customizing the range of acceptable write conditions to a tape of a tape cartridge that contracts or expands laterally based on environmental conditions. Specifically, in one embodiment, the tape drive utilizes servo information to determine if the tape has expanded or contracted laterally from the nominal dimension. Further, the tape drive utilizes the servo information to determine the magnitude of the expansion or contraction. The magnitude of expansion or contraction and previously stored extremes of expansion or contraction are used to determine if a write operation should be allowed to the tape of the tape cartridge. In the case of expansion, the magnitude of the determined expansion and the stored maximum acceptable amount of contraction must be below a predetermined threshold value to allow a write. In the case of contraction, the magnitude of the determined contraction and the stored magnitude of expansion must be below the same predetermined threshold value to allow a write. The predetermined threshold value defines the size of the range of tape drive acceptable write conditions to the tape of the tape cartridge. The sum of the maximum acceptable amount of expansion and the maximum acceptable amount of contraction must be at or below the predetermined threshold value. If the determined magnitude of contraction or expansion is greater than the stored magnitude of contraction or expansion, respectively, then the new extreme is stored. Thus, if the tape cartridge is in an environment in which the tape tends to contract, then the acceptable write conditions skews to a contracting environment. Further, since the range of acceptable write conditions is customized to the environment experienced by the tape of a tape cartridge, a smaller portion of the TMR budget may be dedicated to tape dimensional stability while still ensuring read back of data.

It will be obvious, however, to one skilled in the art, that embodiments of the present invention may be practiced without some or all of these specific details. In other instances, well known process operations have not been described in detail to prevent obscuring the embodiments of the present invention described herein.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Magnetic tape includes multiple parallel servo tracks and data tracks. A corresponding magnetic read/write head includes a number of transducing elements to read from or write to at least some of the tracks simultaneously. To access other tracks, a head assembly is moved laterally across the width of the tape. The servo tracks on the tape media assist the transducing elements to maintain a proper position on the data tracks.

Multi-track longitudinal recording systems, such as LTO tape drives, typically write tracks wide and read narrow to account for registration errors between the time the tape was written and then read. As tracks become narrower to allow for increased tape capacity, even minute changes in the position of a track may lead to track misregistration (TMR) and the inability to properly record to, or read from, a track.

Tape drives generally have a track misregistration budget (TMR budget) which is some percentage of the difference between the write and read width. Data error rates can rise drastically whenever the TMR budget is exceeded.

Tape Dimensional Stability (TDS) is a measure of the positional stability of the magnetic data tracks relative to each other and is a function of the tape properties and environmental effects such as temperature, humidity, tension, and creep. These environmental factors can cause the tape to expand or contract laterally, across the width of the tape. Some of these dimensional changes are reversible and some are not. While the read/write head of a tape drive can also experience dimensional changes from these environmental effects, the changes are on orders of magnitude less than the changes that occur in the media. Therefore, when a tape is written to in one environmental extreme and subsequently read from in another extreme, the position of the data tracks across the tape width can change enough to cause signal degradation or read errors. For example, if a tape is written during the time a tape is subjected to a dry environment and is then subsequently read in a high humidity environment, the position of the data tracks across the tape width can expand enough to cause problems when reading the previously written data. Herein, the terms expansion and contraction will refer to expansion and contraction laterally, across the width of the tape.

Accordingly, a portion of the TMR budget is dedicated to account for the changes in position of the data tracks. This portion of the TMR budget is herein referred to as the TDS budget and defines how much the tape's lateral dimension can change while still expecting that a write performed at that condition will be able to be subsequently read. A TDS maximum value is the largest acceptable expansion value the media specification will allow. The TDS minimum value is the largest acceptable contraction amount the media specification will allow. The TDS maximum and minimum values defined in the media specification establish a range of conditions for the write operations of a tape drive, and is referred to herein as a TDS range. Further, the TDS maximum and minimum values are determined such that the tape could be written to in one environmental extreme and subsequently read from in another extreme without signal degradation or read errors. However, the reality is that most tapes are written in one location and also read in the same location such that there is little change in the environmental conditions. For example, a tape written in a relatively dry climate usually remains in that climate and is read in that climate. Thus, the previous range for TDS maximum and minimum values were based on a "worst-case scenario" situation and require a large portion of the TMR budget to account for all conditions.

The present invention seeks to customize the range of acceptable write conditions to the tape of a tape that contracts or expands laterally based on environmental conditions. Further, in one embodiment, the present invention detects over time, the various environments the tape has experienced, and allows write operations up to a maximum, predefined TDS change without necessarily allowing the full TDS range defined in the media specification. This enables the tape drive to ensure that all write operations are contained within a reliable TMR range.

FIG. 1 illustrates an example of a tape drive 10, which may comprise a magnetic tape data storage drive which writes data 18 to, and reads data from, an elongate tape 11 which may comprise magnetic tape data storage media. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive.

The magnetic tape media 11 is moved in the longitudinal direction across a read/write and servo tape head system 65. The tape head may be supported and laterally moved by an actuator 17 of a track following servo system. The magnetic tape media is supported by roller tape guides 50, 51, 52, 53, while the magnetic tape media is moved longitudinally.

A typical magnetic tape data storage drive operates in both the forward and reverse directions to read and write data. Thus, the magnetic tape head system 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

Figure 2:
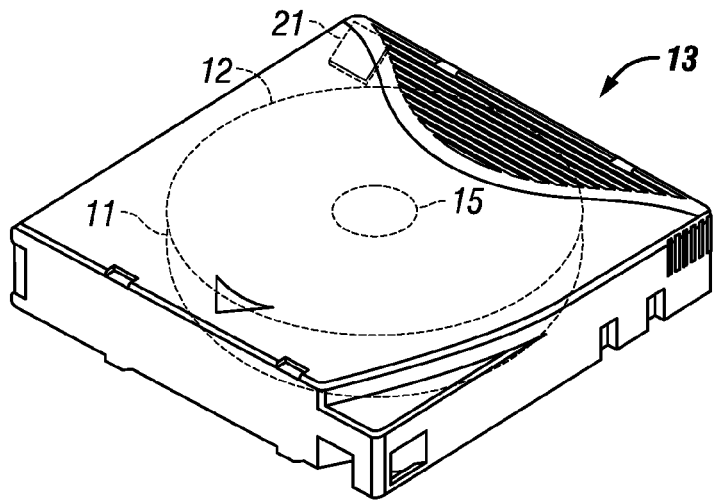
FIG. 2 illustrates a view of a tape cartridge accordance with an embodiment of the invention.

Referring to FIG. 2, a single reel tape cartridge 13 comprising magnetic tape 11, is illustrated wherein the magnetic tape 11 is wound on a hub 15 of supply reel 12. A cartridge memory 21 may store information regarding the data storage cartridge and, for example, comprises a transponder.

Figure 3:
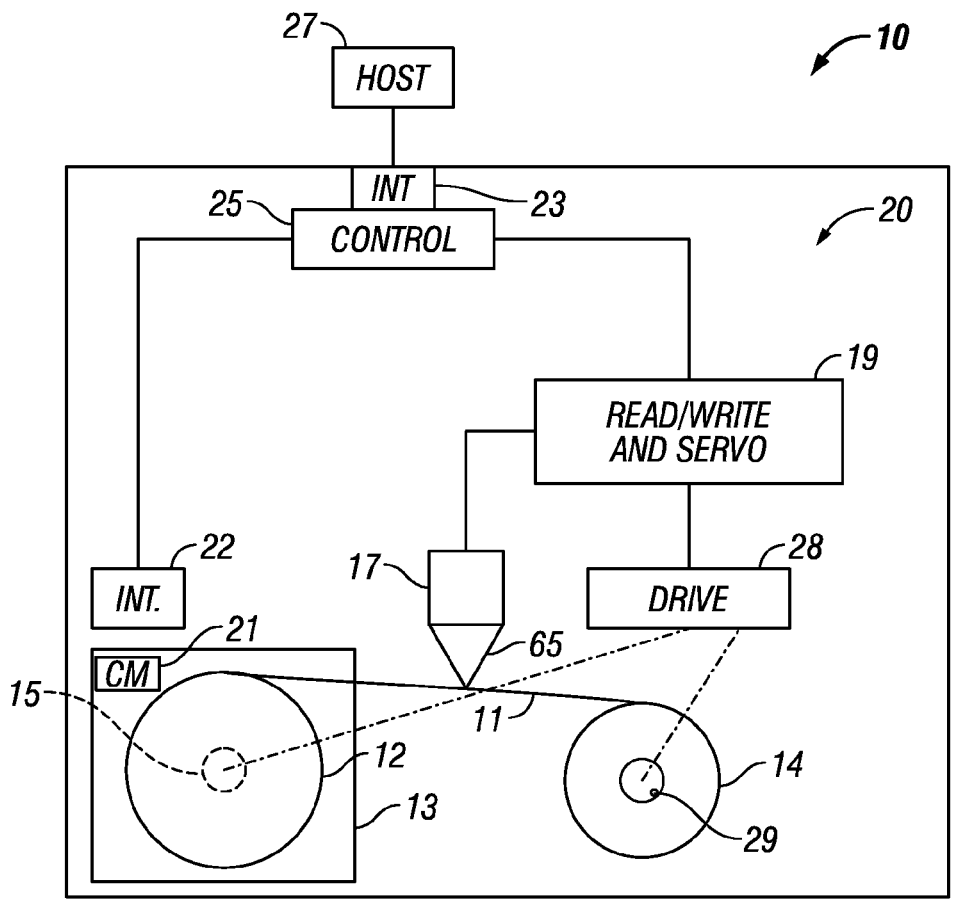
FIG. 3 is a schematic view of the tape drive with a tape cartridge and elongate tape in accordance with an embodiment of the invention.

Referring to FIG. 3, the magnetic tape drive 10 is illustrated wherein the magnetic tape 11 is wound on supply reel 12 in the cartridge 13, and, when loaded in the magnetic tape drive 10, is fed between the cartridge reel 15 and a take up reel 14, having hub 29, in the magnetic tape drive 10.

The magnetic tape drive 10 comprises a memory interface 22 for reading information from, and writing information to, the cartridge memory 21 of the magnetic tape cartridge 13. A read/write system is provided for reading and writing information to the magnetic tape, and, for example, may comprise a read/write and servo head system 65 with a servo actuator 17 for moving the head laterally across the magnetic tape 11, a read/write servo system 19, and a drive motor system 28 which moves the magnetic tape 11 between the cartridge supply reel 12 and the take up reel 14 and across the read/write and servo head system 65. A control 25, read/write servo control 19, and drive motor system 28 form a drive control system 20. The read/write and servo system 19 also controls the operation of the drive motor system 28 to move the magnetic tape 11 across the read/write and servo head system 65 at a desired velocity, and, in one example, determines the lateral location of the read/write and servo head system 65 with respect to the magnetic tape 11, and, in another example, determines the longitudinal position of the tape 11 by reading the tape servo tracks, for example, called "LPOS" (Longitudinal POSition), and in another example, the read/write and servo system 19 employs signals from the reel motors to determine the location of the read/write and servo head system 65 with respect to the magnetic tape 11. An interface 23 provides communication with respect to one or more host systems or processors 27, and is configured to receive and to send information externally of the tape drive 10. Alternatively, the tape drive 10 may form part of a subsystem, such as a library, and may also receive commands from the subsystem, also at interface 23.

A control 25 communicates with the host interface 23, with memory interface 22, and communicates with the read/write system, e.g., at read/write and servo system 19. The illustrated embodiments of tape drives are known to those of skill in the art.

Other types of removable data storage cartridges and tape drives are known to those of skill in the art. Examples comprise two reel magnetic tape cartridges and drives, and comprise optical tape cartridges and drives.

Figure 4:
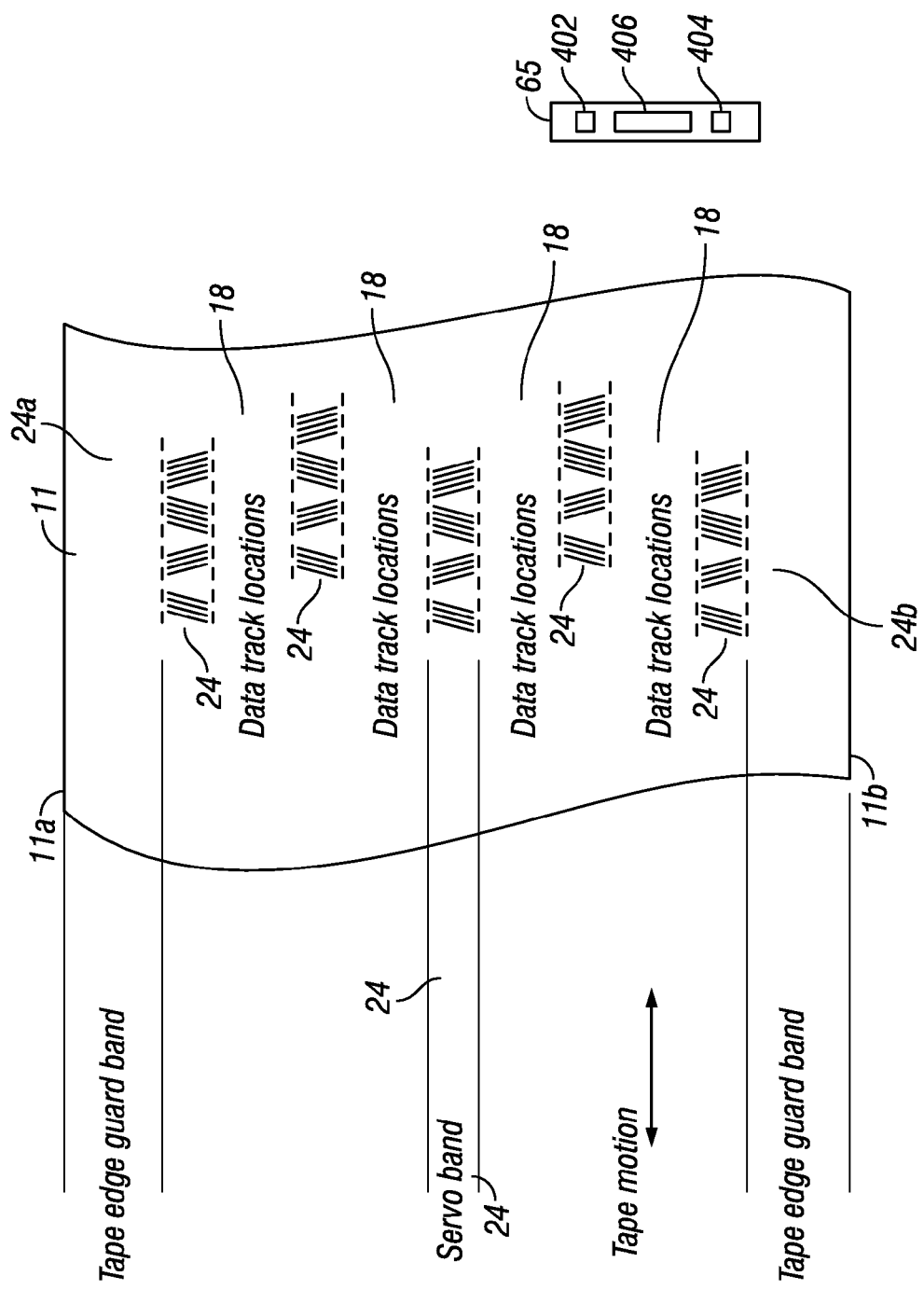
FIG. 4 is a schematic view of a servo format and a magnetic tape head in accordance with an embodiment of the invention.

Referring additionally to FIG. 4, the magnetic tape 11 is formatted during manufacture with a plurality of servo bands 24 that are parallel to the edges 11a and 11b of the magnetic tape 11. The read/write and servo system 19 of FIG. 3 employs the servo signals 24 as read by servo elements 402 and 404 of the read/write and servo head system 65 to position the read/write and servo head system 65 laterally with respect to the magnetic tape. Further, the multiple read/write elements 406 read and/or write data from data tracks of the data bands 18. No data is written in tape guard bands 24a or 24b at the tape edges, and the data bands 18 each lies between a set of servo bands 24.

Figure 5:
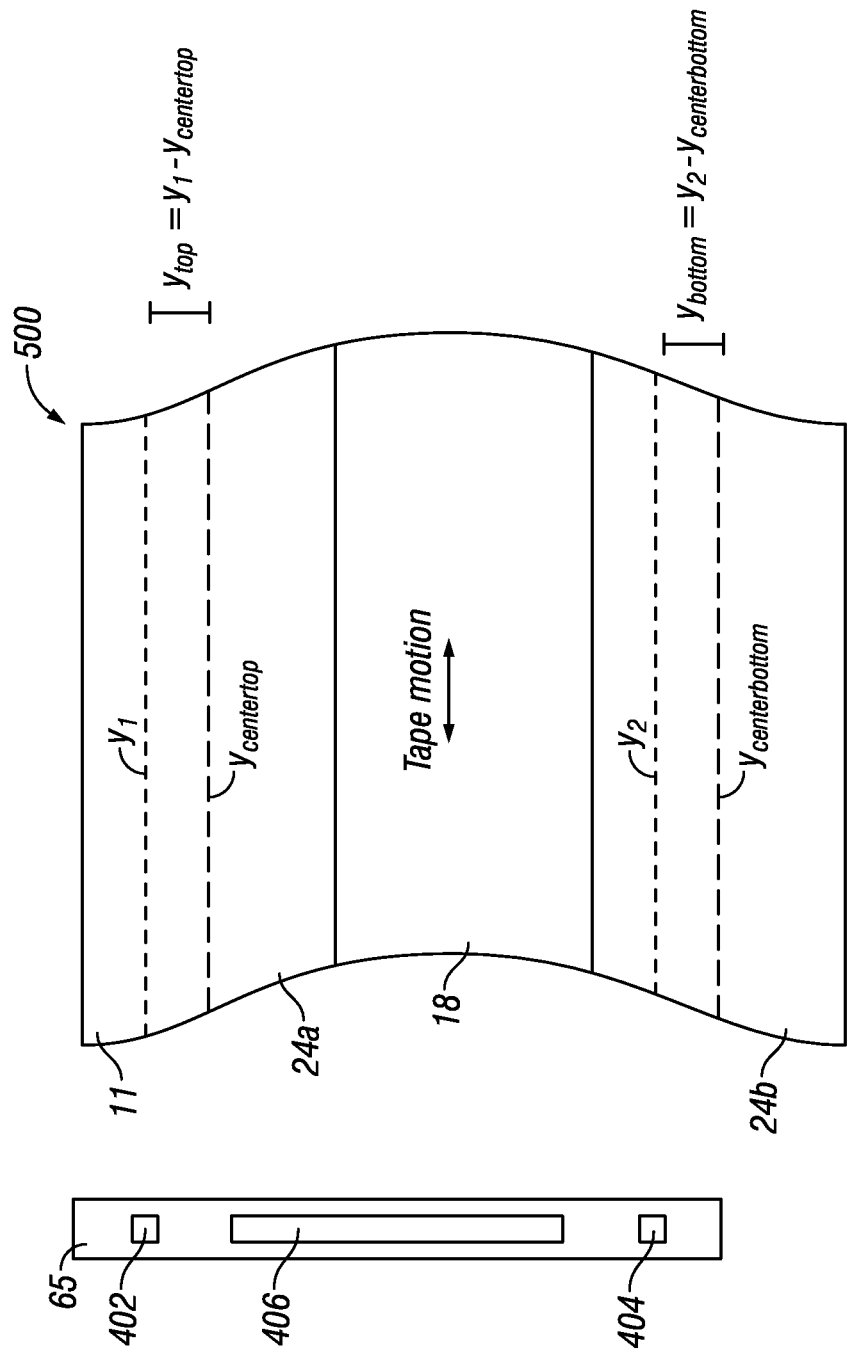
FIG. 5 is a schematic view of a portion of tape and a magnetic tape head in accordance with an embodiment of the invention.

FIG. 5 shows a detailed view of a portion 500 of magnetic tape 11 with an exemplary servo head system 65 in accordance with an embodiment of the invention. The portion 500 includes a top servo band 24a and a bottom servo band 24b. In between the tape servo band 24a and the bottom servo band is data 18. As shown, the top servo band 24a has a centerline, $y_{centertop}$. In this illustration, the top servo element 402 is located at $y_1$ as the servo head system 65 is moved longitudinal along the tape 11. The value of $y_{top}$ is the difference between the position, $y_1$, of the servo element 402 over the top servo band 24a and the centerline, $y_{centertop}$, of the top servo band 24a. Further, the bottom servo band 24b has a centerline, $y_{centerbottom}$. In this illustration, the bottom servo element 404 is located at $y_2$ as the servo head system 65 is moved longitudinal along the tape 11. Accordingly, the value of $y_{bottom}$ is the difference between the position, $y_2$, of the servo element 404 over the bottom servo band 24b and the centerline, $y_{centerbottom}$, of the bottom servo band 24b. The difference between $y_{top}$ and $y_{bottom}$ can be used to determine if the tape has expanded or contracted laterally as discussed below with respect to FIG. 6. It should be noted that $y_1$ and $y_2$ have positive values if they are greater than $y_{centertop}$ and $y_{centerbottom}$, respectively. Conversely, $y_1$ and $y_2$ have negative values if they are less than $y_{centertop}$ and $y_{centerbottom}$, respectively.

Figure 6:
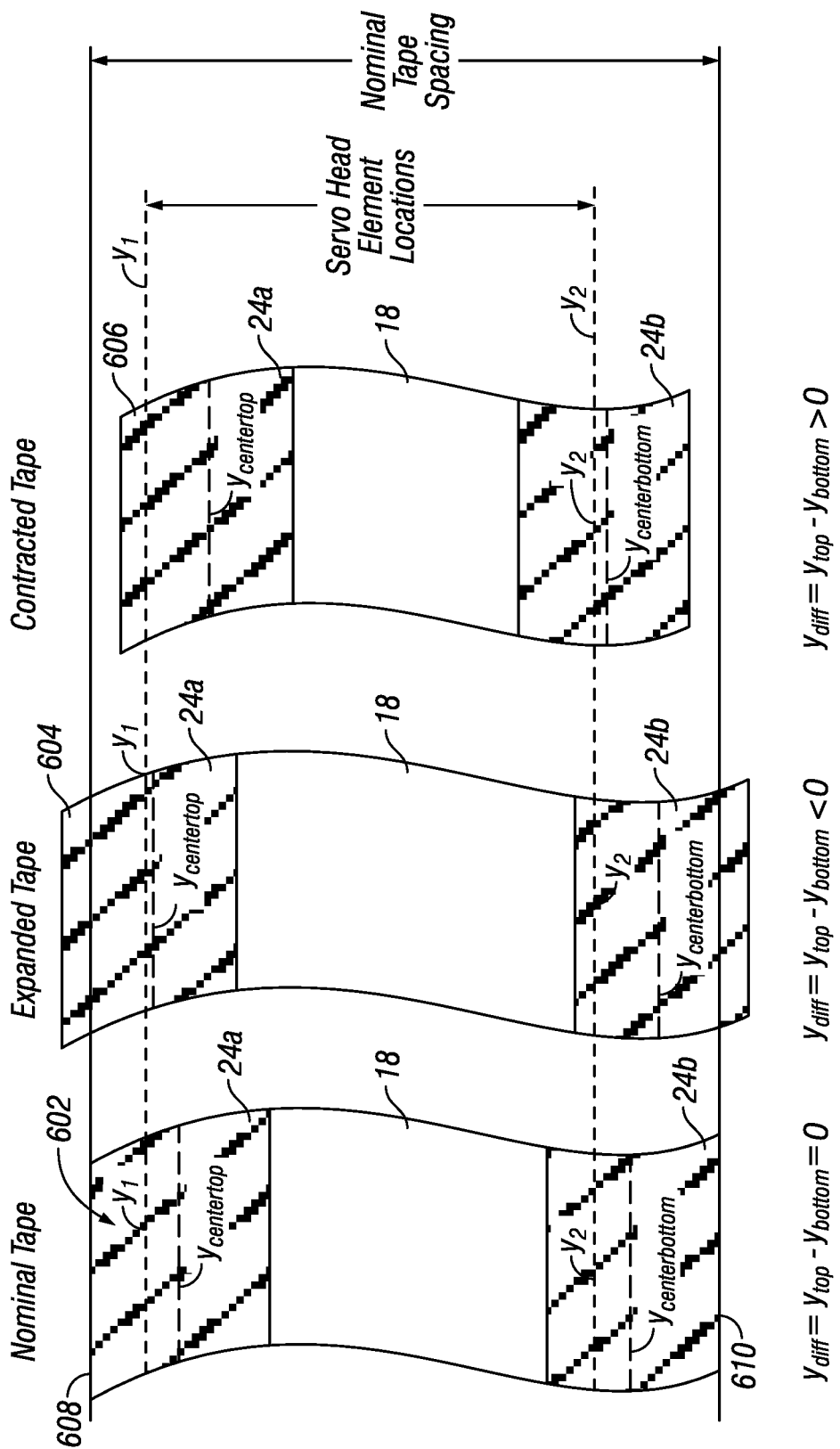
FIG. 6 is a schematic view of portions of tape of nominal, expanded and contracted dimension in accordance with an embodiment of the invention.

FIG. 6 illustrates three portions of tape for comparison purposes. The first portion of tape is at a nominal lateral tape dimension, and is herein referred to as nominal tape 602. The nominal tape 602 is not expanded or contracted due environmental effects. The second portion of tape has been expanded by environmental effects, and is herein referred to as expanded tape 604. The third portion of tape has been contracted by environmental effects, and is herein referred to as contracted tape 606. FIG. 6 shows the servo head element locations $y_1$ and $y_2$ as dotted lines. Further, the nominal tape 602 has edges of servo bands 608 and 610 for the top servo band and bottom servo band, respectively. The nominal tape edges 608 and 610 define the nominal tape spacing shown in FIG. 6.

As discussed above, the value of $y_{top}$ is the difference between the position, $y_1$, of the servo element 402 over the top servo band 24a and the centerline, $y_{centertop}$, of the top servo band 24a. The value of $y_{bottom}$ is the difference between the position, $y_2$, of the servo element 404 over the bottom servo band 24b and the centerline, $y_{centerbottom}$, of the bottom servo band 24b. The distance between the servo head elements 402 and 404 are manufactured to be the same distance apart as the nominal distance between the same point on two adjacent servo bands, for example the center of the servo band ($y_{centertop}$ and $y_{centerbottom}$). Accordingly, the difference, defined here as $y_{diff}$, between the obtained $y_{top}$ and $y_{bottom}$ is equal to zero in the nominal tape that is not expanded or contracted laterally.

As shown in FIG. 6, because of the expansion of tape, the difference, $y_{diff}$, in the expanded tape portion 604, between the obtained $y_{top}$ and $y_{bottom}$ is less than zero. The amount of expansion is determined by magnitude of the value of $y_{diff}$ below zero. Further, FIG. 6 also illustrates that the portion of tape that is contracted, contracted tape 606, difference, $y_{diff}$, between the obtained $y_{top}$ and $y_{bottom}$ is greater than zero. The amount of contraction is determined by magnitude of the value of $y_{diff}$ above zero. Thus, the read/write and servo system 19 of the tape drive 10 utilizes the information from the servo head elements 402 and 404 to detect the servo head elements' 402 and 404 positions with respect to the servo bands 24 and determine whether the tape 11 has expanded and contracted and to what extent. In one embodiment, $y_1$, $y_2$, $y_{top}$, $y_{bottom}$, $y_{centertop}$, $y_{centerbottom}$, and $y_{diff}$ have units of length which are measured in microns or scaled microns. However, one of ordinary skill in the art would understand that $y_1$, $y_2$, $y_{top}$, $y_{bottom}$, $y_{centertop}$, $y_{centerbottom}$, and $y_{diff}$ may be measured in any unit of length.

It should be appreciated that such operations can be embodied as a method implemented as an algorithm having software modules that are implemented by a computing system. Further, the method can be embodied as software on any computer readable media, as dedicated firmware, or as a combination of software and firmware, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
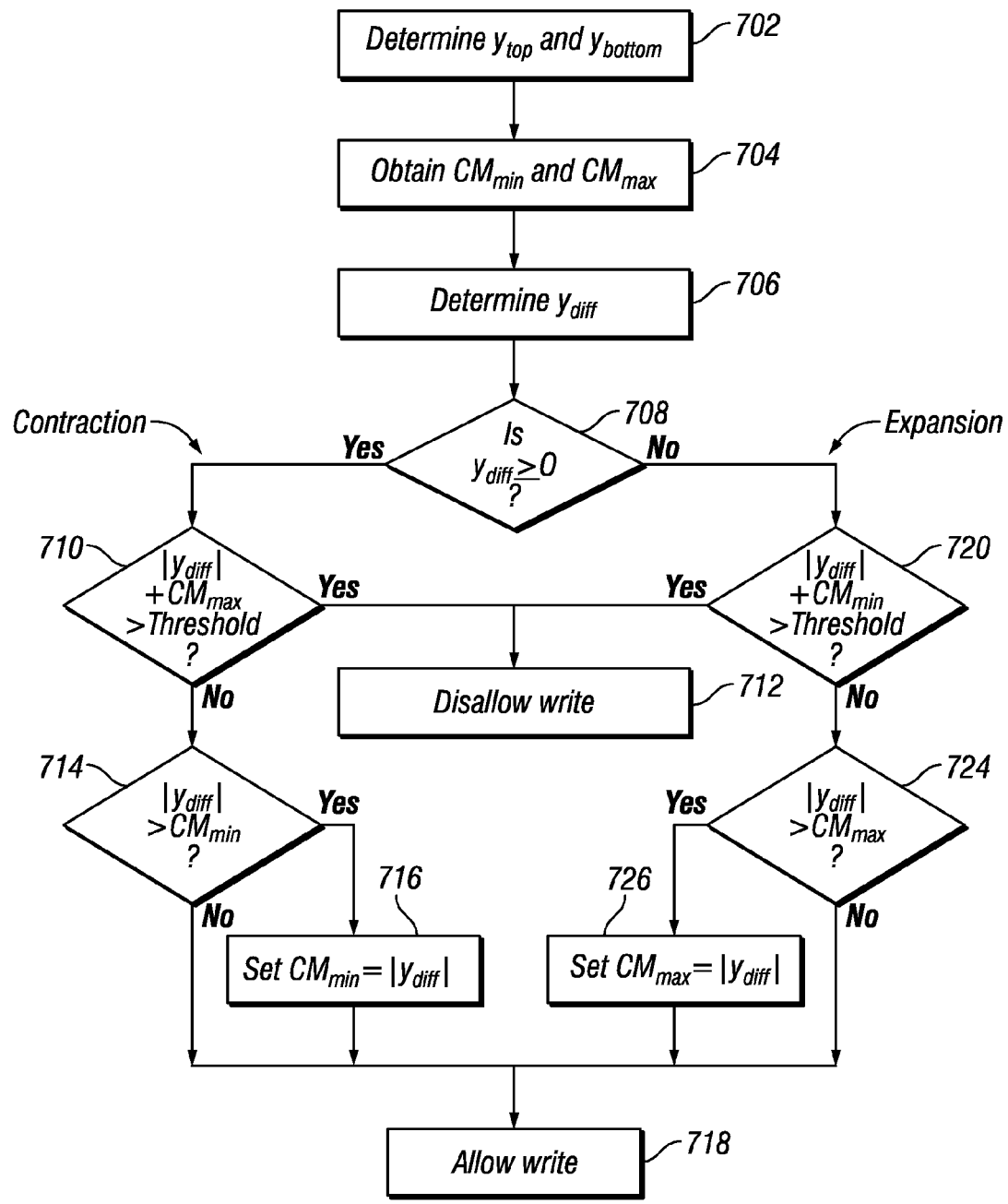
FIG. 7 is a flow chart of an exemplary method of establishing a range of acceptable write conditions in accordance with an embodiment of the invention.

FIG. 7 illustrates an embodiment of detecting the magnitude of lateral expansion or contraction prior to a write operation and determining if the conditions are acceptable for writing to the magnetic tape 11 based on a predetermined threshold value. Further, FIG. 7 illustrates and embodiment of determining a maximum expansion and a maximum contraction for a range of acceptable write conditions on tape of a tape cartridge.

The value of $CM_{min}$ is the stored amount of maximum acceptable contraction. Similarly, the value of $CM_{max}$ is the stored amount of maximum acceptable expansion so far experienced by the tape media 11. In one embodiment, $CM_{min}$ and $CM_{max}$ have units of length which are measured in microns or scaled microns. However, one of ordinary skill in the art would understand that $CM_{min}$ and $CM_{max}$ may be measured in any unit of length. The maximum expansion and maximum contraction values, $CM_{max}$ and $CM_{min}$, respectively, are initialized to zero. In one embodiment, $CM_{max}$ and $CM_{min}$ are initialized to zero at the time of manufacture of the tape 11 or for a tape 11 that is written to from the beginning of tape 11 of tape cartridge. Those skilled in the art would understand that when a tape is written to from the beginning of tape, or a "write from zero", the tape is reformatted. Accordingly, reformatting enables the user to refresh the values $CM_{max}$ and $CM_{min}$. For example, the tape 11 of tape cartridge 13 could be reformatted and the values of $CM_{max}$ and $CM_{min}$ could be refreshed in the event the tape cartridge 13 is moved to a different climate, having different environmental conditions.

In one embodiment, the following algorithm is in the tape drive's microcode. Alternatively, in another embodiment, the algorithm is part of the tape drive's hardware. The process begins in step 702. In one embodiment the process may begin in response to a load of tape cartridge 13. In step 702, the magnetic tape drive 10 determines the values of $y_{top}$ and $y_{bottom}$. As discussed with respect to FIGS. 5 and 6, the value of $y_{top}$ is the difference between the measured position, $y_1$, of the servo element 402 over the top servo band 24a and the centerline, $y_{centertop}$, of the top servo band 24a. The value of $y_{bottom}$ is the measured difference between the position, $y_2$, of the servo element 404 over the bottom servo band 24b and the centerline, $y_{centerbottom}$, of the bottom servo band 24b.

In step 704 the magnetic tape drive 10 obtains the values stored for $CM_{min}$ and $CM_{max}$. As explained above, the values stored for $CM_{min}$ and $CM_{max}$ are initialized at zero. In one embodiment, the values for $CM_{min}$ and $CM_{max}$ are stored in the cartridge memory 21 of tape cartridge 13. In this embodiment, a memory interface 22 for reading information from, and writing information to, the cartridge memory 21 may be utilized. In one embodiment, the memory interface is a radio frequency identification tag (RFID tag) to read information from, and write information to cartridge memory 21, as known by those skilled in the art. However, one of ordinary skill in the art would understand that the values of $CM_{min}$ and $CM_{max}$ could be stored in another memory device or on the tape media 11 itself.

In step 706 the tape drive 10 determines the difference, $y_{diff}$, between the determined $Y_{top}$ and $y_{bottom}$. As discussed above with respect to FIGS. 5 and 6, the difference, $y_{diff}$, between the determined $y_{top}$ and $y_{bottom}$ determines whether the tape has laterally expanded or contracted. In step 708 it is determined if $y_{diff}$ is greater than, or equal to zero. If it is determined that $y_{diff}$ is greater than, or equal to zero, then the tape has contracted and the process proceeds to step 710. If it is determined that $y_{diff}$ is not greater than, or equal to zero, then the tape has expanded and the process proceeds to step 720.

In the case where the tape has contracted, in step 710, the magnetic tape drive 10 determines if the sum of the absolute value of $y_{diff}$ and the $CM_{max}$ is greater than a predetermined threshold value. In one embodiment, the predetermined threshold has units of length, measured in microns or scaled microns. However, one of ordinary skill in the art would understand that the predetermined threshold may be measured in any unit of length. Accordingly, in step 710 the tape drive 10 is determining if the amount of contraction and the previously stored maximum acceptable amount of expansion is greater than a predetermined threshold value. In one embodiment, the predetermined threshold value is the portion of the TMR budget that is allocated for tape dimensional stability. The predetermined threshold value may be established through TMR analysis, TDS analysis and testing, or other means known by those skilled in the art. If the tape drive 10 determines that the sum of the absolute value of $y_{diff}$ and the $CM_{max}$ is greater than a predetermined threshold value, then the process flows to step 712. In step 712 a write command that may be subsequently received will be disallowed such that the tape drive 10 does not perform a write operation.

However, if the tape drive 10 determines that the sum of the absolute value of $y_{diff}$ and the $CM_{max}$ is not greater than a predetermined threshold value in step 710, then the process flows to step 714. In step 714, the magnetic tape drive 10 determines if the absolute value of $y_{diff}$ is greater than $CM_{min}$. In this step, the tape drive 10 is determining if the amount of contraction of the tape determined in step 706 is greater than the amount of contraction that the tape has previously experienced, while still allowing a write to the tape 11 (e.g. the stored maximum acceptable amount of contraction). If the absolute value of $y_{diff}$ is greater than $CM_{min}$, thus indicating that the amount of contraction is a new maximum acceptable amount of contraction, then in step 716 the tape drive 10 sets the value of $CM_{min}$ as the absolute value of $y_{diff}$ and the process flows to step 718. In one embodiment, the tape drive 10 sets the value of the $CM_{min}$ as the absolute value of $y_{diff}$ by storing the value of $y_{diff}$ as $CM_{min}$ in the cartridge memory 21. However, if the tape drive 10 determines in step 714 that the absolute value of $y_{diff}$ is not greater than $CM_{min}$, then no value is set and the process flows to step 718. In step 718 a write command that may be subsequently received is allowed such that the tape drive 10 performs a write to the tape 11.

Returning to step 708, in which the tape drive 10 determines if $y_{diff}$ is greater than, or equal to zero. If it is determined that $y_{diff}$ is not greater than, or equal to zero, then the tape has expanded and the process proceeds to step 720.

In step 720, the magnetic tape drive 10 determines if the sum of the absolute value of $y_{diff}$ and the $CM_{min}$ is greater than the predetermined threshold value. Accordingly, in step 720 the tape drive 10 is determining if the amount on expansion and the previously stored maximum acceptable amount of contraction is greater than a set threshold. If the tape drive 10 determines that the sum of the absolute value of $y_{diff}$ and the $CM_{min}$ is greater than the predetermined threshold value, then the process flows to step 712. As discussed above, in step 712 the write command that may be subsequently previously received will be disallowed such that the tape drive 10 does not perform a write operation.

However, if the tape drive 10 determines that the sum of the absolute value of $y_{diff}$ and the $CM_{min}$ is not greater than a predetermined threshold value in step 720, then the process flows to step 724. In step 724, the magnetic tape drive 10 determines if the absolute value of $y_{diff}$ is greater than $CM_{max}$. In this step, the tape drive 10 is determining if the amount of expansion of the tape determined in step 706 is greater than the amount of expansion that the tape has previously experienced, while still allowing a write to the tape 11 (e.g. the stored maximum acceptable amount of expansion). If the absolute value of $y_{diff}$ is greater than $CM_{max}$, thus indicating that the amount of expansion is a new maximum acceptable amount of expansion, then in step 726 the tape drive 10 sets the value of $CM_{max}$ as the absolute value of $y_{diff}$ and the process flows to step 718. In one embodiment, the tape drive 10 sets the value of the $CM_{max}$ as the absolute value of $y_{diff}$ by storing the value of $y_{diff}$ as $CM_{max}$ in the cartridge memory 21. However, if the tape drive 10 determines in step 724 that the absolute value of $y_{diff}$ is not greater than $CM_{max}$, then no value is set and the process flows to step 718. In step 718 a write command that may be subsequently received is allowed, such that the tape drive 10 performs a write to the tape 11.

In one embodiment, the process as described in FIG. 7 is repeated for load of tape cartridge 13 by the tape drive 10. Accordingly, for each load of tape cartridge 13, the tape drive 10 determines if the tape 11 of the tape cartridge 13 has laterally expanded or contracted. In addition, the tape drive 10 determines the amount of contraction or expansion the tape 11 has experienced. The tape drive 10 stores the amount of contraction or expansion of the tape 11 if it is a new extreme which does not cause the range of maximum acceptable amount of contraction and the maximum acceptable amount of expansion to exceed the predetermined threshold value. The tape drive 10 does not allow a write if the environmental conditions cause the tape 11 to laterally expand greater than the maximum acceptable amount of expansion or if the environmental conditions cause the tape 11 to laterally contract greater than the maximum acceptable amount of contraction. Thus, if an environment tends to be dry such that the tape tends to contract the tape drive 10 will store larger extremes for the maximum acceptable amount of contraction, $CM_{min}$, rather than the maximum acceptable amount of expansion $CM_{max}$. Accordingly, the range of acceptable write conditions will skew towards a contracting environment. On the other hand, if an environment tends to be humid, such that the tape tends to expand, then the tape drive 10 will store larger extremes for the maximum acceptable amount of expansion, $CM_{max}$, rather than the maximum acceptable amount of contraction $CM_{min}$. Accordingly, the range of acceptable write conditions will skew towards an expanding environment.

It should be noted that the predetermined threshold may be defined for a particular tape media 11 of a tape cartridge 13. The predetermined threshold may be different for another tape cartridge 13 due to thickness of the tape, track pitch, tape media vendors, tape generations, etc. Accordingly, the tape drive 10 may store a predetermined threshold for one or more varieties of tape media or generations of tape media, etc., as necessary. In one embodiment, the predetermined threshold value may be established through TMR analysis, TDS analysis and testing, or other means known by those skilled in the art. Still further in one embodiment, two separate and different thresholds; a contraction threshold and an expansion threshold can be established. Accordingly, the separate contraction threshold and the expansion threshold can account can account for tape media that may be more susceptible to read errors in a particular environment.

In one embodiment, the tape drive 10 can determine the values of $y_1$, $y_2$, $y_{top}$, $y_{bottom}$, $Y_{centertop}$, $y_{centerbottom}$, and $y_{diff}$ at the beginning of tape 11 upon loading the tape cartridge 13. However, one of ordinary skill in the art would understand that the measurements and determination of $y_1$, $y_2$, $y_{top}$, $y_{bottom}$, $y_{centertop}$, $y_{centerbottom}$, and $y_{diff}$ can be performed any where along the length of the longitudinal tape 11.

The process steps of FIG. 7 are described as being in response to loading a tape cartridge 13. However, one of ordinary skill in the art would understand that the frequency of the process steps may be more frequent than every load of tape cartridge 13, or less frequent than every load of tape cartridge 13. In one embodiment, the user or the manufacturer can specify the frequency of the performing the process steps of FIG. 7. For example, a user may want to process steps could be performed in response to every write request, or at specific locations along the length of the tape 11, at specific time intervals such as days, weeks, months, etc.

Further, in one embodiment a flag may be set to indicate if a write command is allowed or disallowed. Accordingly, if the process indicates that a write command is disallowed, a flag is set to disallow the write command. The tape drive 10 may then check the flag prior to performing a subsequent write command to determine if the command should be allowed. One of ordinary skill in the art would understand that the flag may be stored in a memory (not shown) of the tape drive 10 or other appropriate memory device. In one embodiment the flag remains until the process of FIG. 7 is repeated. As described above, the process of FIG. 7 is repeated in response to loading a tape cartridge, or at another manufacturer or user desired frequency, as necessary.

Figure 9:
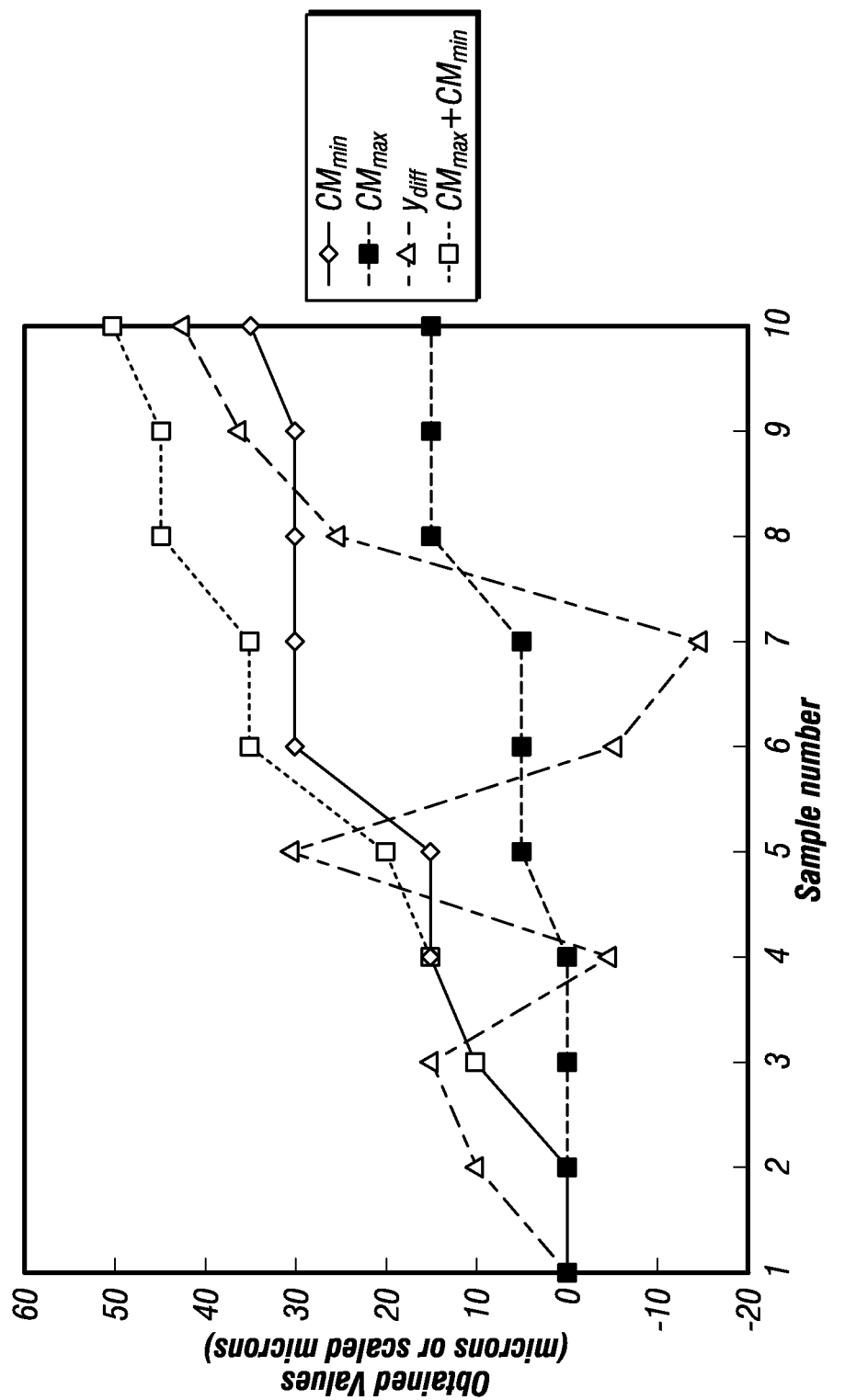
FIG. 9 is a graphical representation illustrating establishing a range of acceptable write conditions with the exemplary values of FIG. 8, in accordance with certain embodiments.

FIGS. 8 and 9 illustrates an exemplary determination of a range of maximum expansion and maximum contraction for acceptable write conditions on tape 11 of a tape cartridge 13 in accordance with an embodiment of the invention. Specifically, FIG. 8 illustrates an example of utilizing the logic of the flowchart illustrated in FIG. 7 to create a range of maximum expansion and maximum contraction for acceptable write conditions on tape 11 of tape cartridge 13. FIG. 9 is a graphical representation of determining the range of maximum expansion and maximum contraction for acceptable write conditions on tape 11 of tape cartridge 13 in accordance with FIGS. 7 and 8. The steps to determine the data illustrated in FIGS. 8 and 9 are described in the flowchart FIG. 7. As discussed above, the process may discussed as being performed in response to loading tape cartridge 13, however, the process can be carried out at any user's or manufacturer's desired frequency as discussed above. In this example, each time the process steps described in FIG. 7 are followed is referred to as a sample. For the purposes of brevity, each sample will not be reviewed in its entirety. Rather, the process should be understood in reference to FIGS. 7, 8, and 9.

Turning to FIG. 8, in this example, the predetermined threshold value is set to be 50. As discussed earlier, the predetermined threshold value is the portion of the TMR budget that is allocated for tape dimensional stability. The predetermined threshold value may be established through TMR analysis, TDS analysis and testing, or other means known by those skilled in the art. As discussed above, the values stored for $CM_{min}$ and $CM_{max}$ are initialized at zero. As discussed with respect to FIG. 7, upon loading tape cartridge 13, in step 706, the tape drive determines the determines the difference, $y_{diff}$, between the determined $y_{top}$ and $y_{bottom}$. As discussed above, the difference, $y_{diff}$, between the determined $y_{top}$ and $y_{bottom}$ determines whether the tape has laterally expanded or contracted. For sample 1 it is determined that the $y_{diff}$ is zero. For the purposes of the process described in FIG. 7, since $y_{diff}$ is greater than, or equal to zero, the tape is said to be contracting and the process flows to step 710 as shown in FIG. 7. The magnetic tape drive 10 determines if the sum of the absolute value of $y_{diff}$ and the $CM_{max}$ is greater than the predetermined threshold value. Since the sum of the absolute value of $y_{diff}$ and the $CM_{max}$ is not greater than the predetermined threshold value of 50 the process flows to step 714. In step 714, the magnetic tape drive 10 determines if the absolute value of $y_{diff}$ is greater than $CM_{min}$. Since the absolute value of $y_{diff}$ is not greater than $CM_{min}$ the tape drive 10 does not store the value of $CM_{min}$ and allows a subsequent write command received to proceed. The values of $CM_{min}$, $CM_{max}$, $y_{diff}$, and the sum of $CM_{min.}$ and $CM_{max}$ are shown for sample 1 in FIG. 9.

Turning to the second load of tape cartridge 13, referred to as sample 2 of FIG. 8, the values stored for $CM_{min}$ and $CM_{max}$ remain zero because the values for $CM_{min}$ and $CM_{max}$ were not stored for the sample 1. For sample 2, the tape drive determines the difference, $y_{diff}$, between $y_{top}$ and $y_{bottom}$. to be 10. Since $y_{diff}$ is greater than zero the tape 11 is said to be contracting and the magnetic tape drive 10 determines if the sum of the absolute value of $y_{diff}$ and the $CM_{max}$ is greater than the predetermined threshold value. The sum of the absolute value of $y_{diff}$ and the $CM_{max}$ is ten and is not greater than the predetermined threshold value of 50 so the magnetic tape drive 10 determines if the absolute value of $y_{diff}$ is greater than $CM_{min.}$ Since the absolute value of $y_{diff}$ is ten, and thus, greater than the previously stored $CM_{min}$ for sample 2, the tape drive 10 stores the value of ten for $CM_{min}$ and allows a subsequent write command received to proceed. As discussed above, in one embodiment, the values for $CM_{min}$ is stored in the cartridge memory 21 of tape cartridge 13. The values of $CM_{min}$, $CM_{max}$, $y_{diff}$, and the sum of $CM_{min.}$ and $CM_{max}$ are shown for sample 2 in FIG. 9.

The process is similar for third load of tape cartridge 13, referred to as sample 3, shown in FIG. 8. The value stored for $CM_{min}$ is now ten and the value stored for $CM_{max}$ remains zero. The tape drive 10 determines $y_{diff}$, to be 15, which is greater than zero. Accordingly, the tape 11 is said to be contracting and the magnetic tape drive 10 determines if the sum of the absolute value of $y_{diff}$ and the $CM_{max}$ is greater than the predetermined threshold value of 50. The sum of the absolute value of $y_{diff}$ and the $CM_{max}$ is 15 and is not greater than the predetermined threshold value of 50 so the magnetic tape drive 10 determines if the absolute value of $y_{diff}$ is greater than $CM_{min.}$ Since the absolute value of $y_{diff}$ is 15, and thus, greater than the previously stored $CM_{min}$ for sample 3, the tape drive 10 stores the value of 15 for $CM_{min}$ and allows a subsequent write command received to proceed. The values of $CM_{min}$, $CM_{max}$, $y_{diff}$, and the sum of $CM_{min.}$ and $CM_{max}$ are shown for sample 3 in FIG. 9.

Turning to the fourth load of tape cartridge 13, referred to as sample 4, shown in FIG. 8. The value stored for $CM_{min}$ is now 15 and the value stored for $CM_{max}$ remains zero. The tape drive 10 determines $y_{diff}$, to be negative 5, which is not greater than zero. Accordingly, the tape 11 is expanding and the magnetic tape drive 10 determines if the sum of the absolute value of $y_{diff}$ and the $CM_{min}$ is greater than the predetermined threshold value of 50. The sum of the absolute value of $y_{diff}$ and the $CM_{max}$ is 20 and is not greater than the predetermined threshold value of 50 so the magnetic tape drive 10 determines if the absolute value of $y_{diff}$ is greater than $CM_{max.}$ In this case, the absolute value of $y_{diff}$ is 5, and thus, greater than the previously stored $CM_{max}$, the tape drive 10 stores the value of 5 for $CM_{max}$ and allows a subsequent write command received to proceed. The values of $CM_{min}$, $CM_{max}$, $y_{diff}$, and the sum of $CM_{min.}$ and $CM_{max}$ are shown for sample 4 in FIG. 9.

The process continues for all samples 1 through 10, as explained above with respect to FIGS. 7, 8, and 9, to determine a maximum expansion value, $CM_{max}$, and a maximum contraction value, $CM_{min}$, for a range acceptable write conditions on tape 11 of tape cartridge 13. Turning now to the tenth load of tape cartridge 13, referred to herein as sample 10. The value stored for $CM_{min}$ is 35 and the value stored for $CM_{max}$ is 15. The tape drive determines $y_{diff}$, to be 40, which is greater than zero. Accordingly, the tape 11 is contracting and the magnetic tape drive 10 determines if the sum of the absolute value of $y_{diff}$ and the $CM_{max}$ is greater than the predetermined threshold value of 50. The sum of the absolute value of $y_{diff}$ and the $CM_{max}$ is 55, and is therefore, greater than the predetermined threshold value of 50 so the magnetic tape drive 10 proceeds to step 712 of FIG. 7 and does not allow a subsequent write command to proceed.

The values of $CM_{min}$, $CM_{max}$, $y_{diff}$, and the sum of $CM_{min.}$ and $CM_{max}$ are shown for all samples 1-10 in FIG. 9. As shown in FIG. 9, as the extremes of expansion and contraction are realized for a particular environment, a maximum expansion and a maximum contraction for a range of acceptable write conditions is established. FIG. 9 illustrates that as the number of samples (e.g. tape cartridge loads) increase, and the maximum amount of expansion, $CM_{max}$, and the maximum amount of contraction, $CM_{min}$, sum to the predetermined threshold value. In subsequent tape cartridge loads, if the amount of expansion and/or contraction (e.g. the magnitude of $y_{diff}$) is greater than the stored $CM_{max}$, or $CM_{min}$, respectively, then a subsequent write command will not be allowed. Thus, the tape drive 10 will only perform write commands when the measured tape expansion or contraction is within the range of $CM_{min}$ and $CM_{max}$ stored within the cartridge memory 21 of the tape cartridge 13.

In summary, described herein are embodiments of an invention for customizing the range of acceptable write conditions to a tape of a tape cartridge that contracts or expands laterally based on environmental conditions. Specifically, in one embodiment, the tape drive utilizes servo information to determine if the tape has expanded or contracted laterally from the nominal dimension. Further, the tape drive utilizes the servo information to determine the magnitude of the expansion or contraction. The magnitude of expansion or contraction and previously stored extremes of expansion or contraction are used to determine if a write operation should be allowed to the tape of the tape cartridge. In the case of expansion, the magnitude of the determined expansion and the stored maximum acceptable amount of contraction must be below a predetermined threshold value to allow a write. In the case of contraction, the magnitude of the determined contraction and the stored magnitude of expansion must be below the same predetermined threshold value to allow a write. The predetermined threshold value defines the size of the range of tape drive acceptable write conditions to the tape of the tape cartridge. The sum of the maximum acceptable amount of expansion and the maximum acceptable amount of contraction must be at or below the predetermined threshold value. If the determined magnitude of contraction or expansion is greater than the stored magnitude of contraction or expansion, respectively, then the new extreme is stored. Thus, if the tape cartridge is in an environment in which the tape tends to contract, then the acceptable write conditions skews to a contracting environment. Further, since the range of acceptable write conditions is customized to the environment experienced by the tape of a tape cartridge, a smaller portion of the TMR budget may be dedicated to tape dimensional stability while still ensuring read back of data.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for establishing a range of maximum expansion and maximum contraction for acceptable write conditions on tape of a tape cartridge, the computer program product comprising a non-transitory computer readable storage medium having program code embodied therewith, the program code executable by a processor to:
   determine if said tape has expanded or contracted in a lateral direction;
   if said tape has expanded in said lateral direction, then:
      determine an amount of expansion;
      determine if a sum of said amount of expansion and a maximum acceptable amount of contraction is less than a predetermined threshold value;
      store said amount of expansion as said maximum acceptable amount of expansion if said sum of said amount of expansion and said maximum acceptable amount of contraction is less than said predetermined threshold value; and
   if said tape has contracted in said lateral direction, then:
      determine an amount of contraction;
      determine if a sum of said amount of contraction and a maximum acceptable amount of expansion is less than said predetermined threshold value; and
      store said amount of contraction as said maximum acceptable amount of contraction if said sum of said amount of contraction and a maximum acceptable amount of expansion is less than said predetermined threshold value.

2. The computer program product of claim 1, further executable by processor to disallow a write operation if said sum of said amount of expansion and said maximum acceptable amount of contraction is greater than said predetermined threshold value.

3. The computer program product of claim 1, further executable by processor to disallow a write operation if said sum of said amount of contraction and said maximum acceptable amount of expansion is greater than said predetermined threshold value.

4. The computer program product of claim 1, wherein a sum of said maximum acceptable amount of contraction and said maximum acceptable amount of expansion are less than, or equal to, said predetermined threshold value.

5. The computer program product of claim 1, wherein said amount of expansion and said amount of contraction of said tape is determined by servo information.

6. The computer program product of claim 1, further executable by processor to store said maximum acceptable amount of contraction and said maximum acceptable amount of expansion are in a cartridge memory of said tape.

7. The computer program product of claim 1, further executable by processor to determine if said tape has expanded or contracted, determine said amount of expansion or amount of contraction, and store said amount of expansion and contraction until said maximum acceptable amount of contraction and said maximum amount expansion sum to said predetermined threshold.

8. A tape drive comprising:
   a head having a plurality of read and write elements and a plurality of servo elements; and
   a drive control system for moving tape across said head;
   wherein said tape drive is operative to:
      determine if the tape has expanded or contracted from a nominal dimension in a lateral direction;
      determine an amount of expansion or an amount of contraction of said tape from a nominal dimension;
      determine if a first sum of said amount of expansion and a first stored amount of contraction is be greater than a predetermined threshold value if it is determined that the tape has expanded, or determining a second sum of said amount of contraction and a first stored amount of said expansion is greater than said predetermine threshold value if it is determined that the tape has contracted;
      disallow said write request if said first sum or said second sum is greater than said predetermined threshold value; and
      allow said write request if said first sum or said second sum is not greater than said predetermined threshold value and store said amount of expansion or said amount of contraction if said determined amount of expansion is greater than said first stored amount of said expansion or said amount of contraction is greater than said first stored amount of said contraction, respectively.

9. The tape drive of claim 8, wherein said amount of expansion and said amount of contraction of said tape is determined by servo information.

10. The tape drive of claim 8, wherein said amount of expansion or said amount of contraction is stored in a cartridge memory of said tape cartridge.

11. A computer program product for evaluating acceptable write conditions on tape of a tape cartridge in response to a write request, the computer program product comprising a non-transitory computer readable storage medium having program code embodied therewith, the program code executable by a processor to:
   determine if the tape has expanded or contracted from a nominal dimension in a lateral direction;
   determine an amount of expansion or an amount of contraction of said tape from a nominal dimension;
   determine if a first sum of said amount of expansion and a first stored amount of contraction is be greater than a predetermined threshold value if it is determined that the tape has expanded, or determining a second sum of said amount of contraction and a first stored amount of said expansion is greater than said predetermine threshold value if it is determined that the tape has contracted;
   disallow said write request if said first sum or said second sum is greater than said predetermined threshold value; and
   allow said write request if said first sum or said second sum is not greater than said predetermined threshold value and store said amount of expansion or said amount of contraction if said determined amount of expansion is greater than said first stored amount of said expansion or said amount of contraction is greater than said first stored amount of said contraction, respectively.

12. The computer program product of claim 11, wherein said amount of expansion and said amount of contraction of said tape is determined by servo information.

13. The computer program product of claim 11, wherein said amount of expansion or said amount of contraction is stored in a cartridge memory of said tape cartridge.

* * * * *